Figure 4:
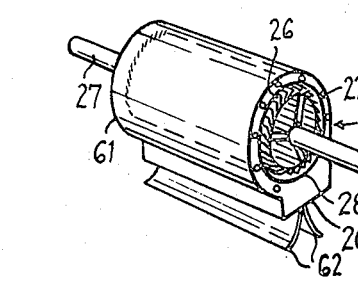

United States Patent [19]

Lakmaker

[11] 3,996,314
[45] Dec. 7, 1976

[54] COOLING APPARATUS

[75] Inventor: Gerard Lakmaker, Northwood, England

[73] Assignee: I.C.M.S. Ltd., London, England

[22] Filed: May 12, 1975

[21] Appl. No.: 576,855

[30] Foreign Application Priority Data

May 30, 1974 United Kingdom ............ 24024/74
Nov. 11, 1974 United Kingdom ............ 48748/74

[52] U.S. Cl. .................................. 261/30; 62/310; 62/314; 165/122; 261/111; 261/DIG. 11
[51] Int. Cl.² ......................................... F28C 1/00
[58] Field of Search ........... 261/DIG. 11, 109, 111, 261/112, 117, 30; 165/122; 62/310, 314

[56] References Cited
UNITED STATES PATENTS

| | | |
|---|---|---|
| 1,039,148 | 9/1912 | Leinert .................... 261/DIG. 11 X |
| 3,165,902 | 1/1965 | Paugh ..................... 261/DIG. 11 X |
| 3,437,319 | 4/1969 | Engalitcheff, Jr. et al ... 261/DIG. 11 X |
| 3,494,109 | 2/1970 | Blazer et al. ............ 261/DIG. 11 X |
| 3,575,387 | 4/1971 | Bradley, Jr. et al. .......... 261/111 X |
| 3,739,556 | 6/1973 | Waters ................... 261/DIG. 11 X |
| 3,754,738 | 8/1973 | Blazer et al. ................ 261/111 X |
| 3,784,171 | 1/1974 | Engalitcheff, Jr. et al ... 261/DIG. 11 X |

Primary Examiner—Frank W. Lutter
Assistant Examiner—William Cuchlinski, Jr.
Attorney, Agent, or Firm—Brisebois & Kruger

[57] ABSTRACT

In an evaporative liquid cooling apparatus comprising a housing having liquid delivery means, heat exchange means beneath the liquid delivery means, liquid collection means beneath the heat exchange means and a chamber beneath the heat exchange means and defined by wall portions of said housing and said liquid collection means, the improvement comprising fan means for delivering a flow of air to the heat exchange means, located inside said chamber, above said liquid collection means, and at least one of said housing wall portions of said chamber defining at least one air inlet aperture for said fan means. The fan means may comprise casing means extending between and directly secured to oppositely facing ones of said housing wall portions with air inlet openings defined by said casing means in alignment with air inlet apertures defined by said oppositely facing ones of said housing wall portions, and at least one centrifugal or axial fan in said casing means or at least one centrifugal fan without said casing means.

Alternatively, the fan means may consist of an axial fan having an impeller mounted on a generally vertical rotatable shaft.

25 Claims, 11 Drawing Figures

Fig.1

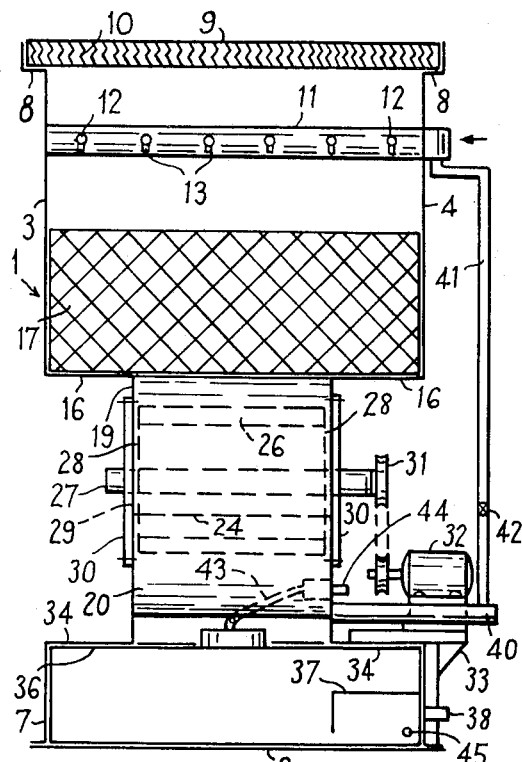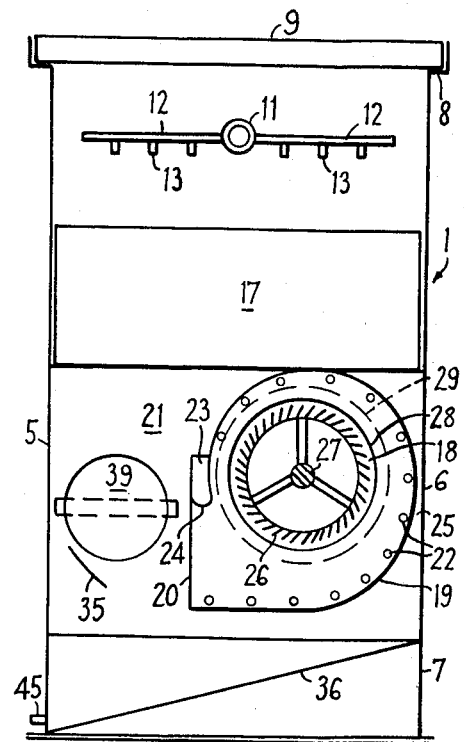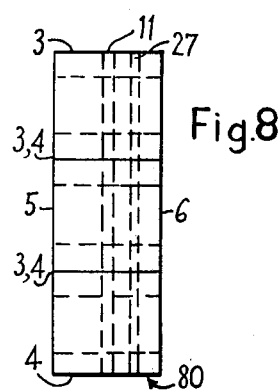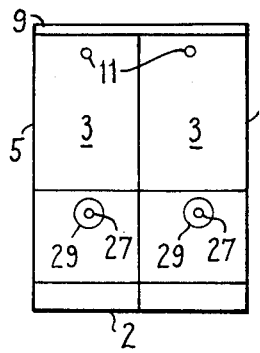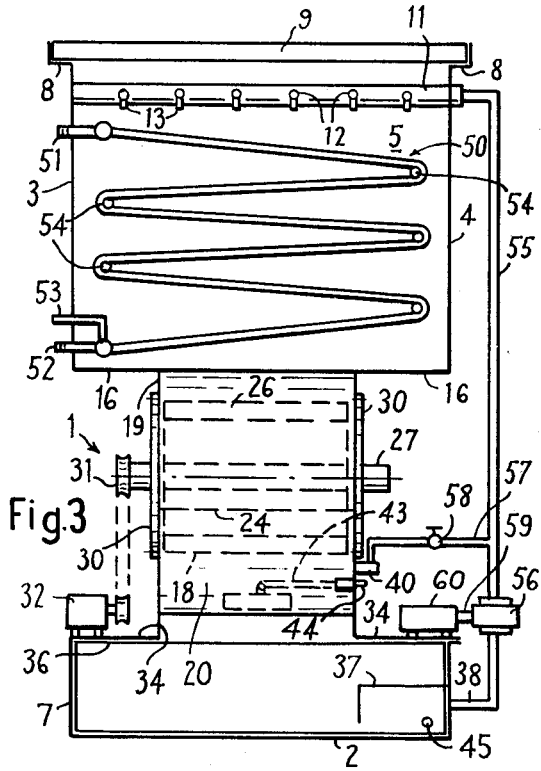

COOLING APPARATUS

This invention relates to cooling apparatus such as cooling towers, evaporative coolers and evaporative condensers.

The invention consists in cooling apparatus including a housing, means for supplying a liquid to said housing, heat exchange means disposed in said housing beneath said supply means, and fan means operative to deliver a flow of air to the heat exchange means, said fan means being located in said housing, beneath said heat exchange means, in a region where air from the fan means may contact liquid from the supply means.

Since the fan means is located in the housing beneath the heat exchange means, in a region where air from the fan may contact liquid from the supply means, the cooling apparatus is, for a given capacity, more compact, quieter, and lighter than other similar forms of cooling apparatus in current use and known to the Applicant.

The fan means may consist of a fan in a casing or a fan without a casing, for example a centrifugal or axial fan. Preferably, the fan means is a centrifugal fan which is disposed in a scroll form of casing or alternatively, two centrifugal fans in scroll casings or axial fans in casings, the casings being in line and conveniently rigidly secured together. The use of one or two centrifugal fans enables the cooling apparatus to be more cheaply produced than the currently used cooling apparatus referred to above.

Preferably, the fan means is adjustably mounted in the housing to vary the direction of air flow from the fan.

The fan casing may be arranged to impart structural support to the housing, enabling the construction of the cooling apparatus to be simplified since it has fewer structural parts as compared to the currently used apparatus.

In a preferred embodiment of the invention the fan casing is secured to oppositely facing side walls of the housing and has air inlet openings which align with air inlet apertures in said housing walls. The securing of the fan casing in this way results in the fan casing and housing providing mutual support.

The fan casing outlet may be provided with fixed or adjustable baffles for directing the air towards the heat exchange means or controlling the air flow volume respectively or a baffle may be arranged in the path of air flow from the fan.

In another preferred embodiment of the invention the housing in constructed from a plurality of separate panels which are fitted together to form a liquid-tight housing.

The housing walls can be shaped such that the cooling apparatus constitutes a module which can be used as a single module basis for a modular assembly comprising a plurality of such modules.

The invention also consists in cooling apparatus comprising a plurality of such modules arranged in at least one line with the fan casings extending in the direction of said at least one line.

Figure 5:
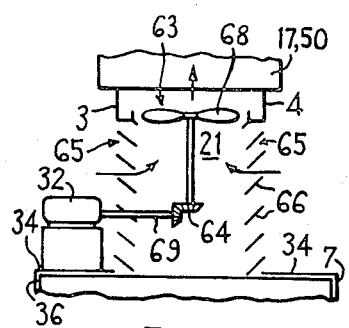
Figure 6:
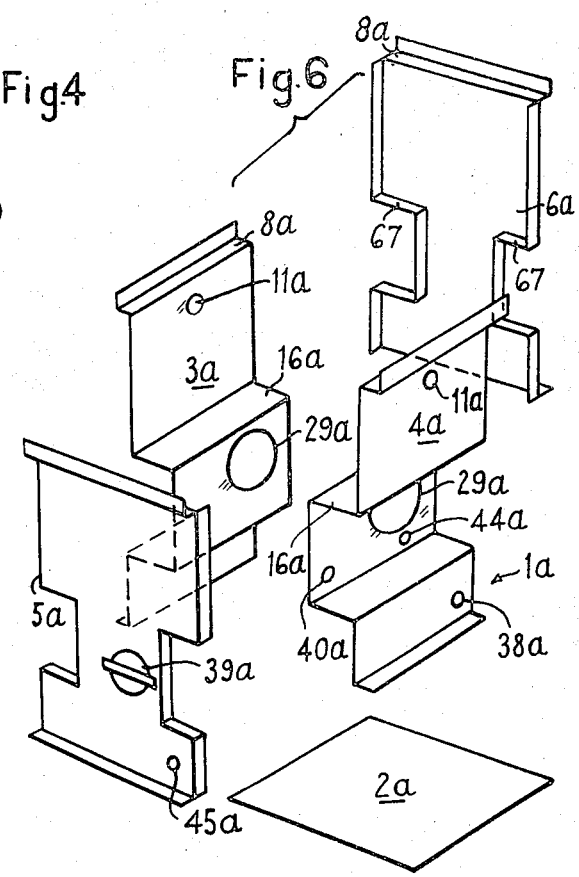
Figure 7:
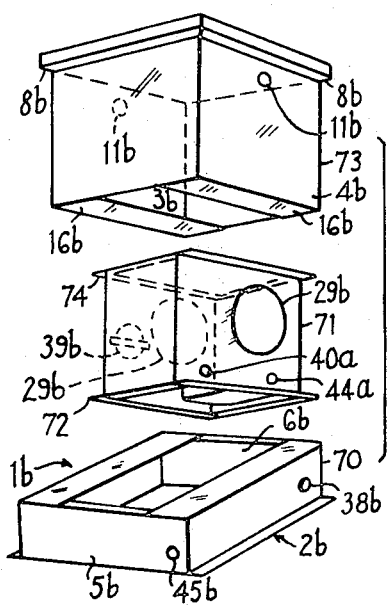
Figure 10:
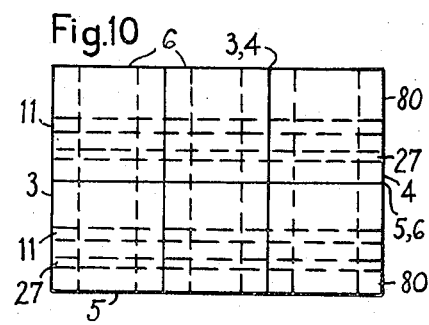
Figure 11:
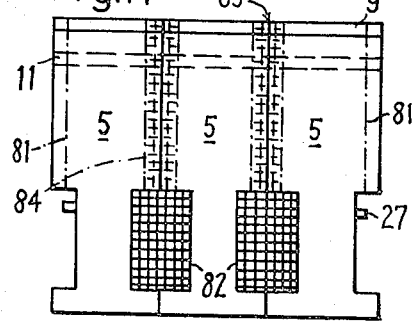

The invention will now be described, by way of example with reference to the accompanying drawings, in which:

FIG. 1 is a diagrammatic front elevation with the front wall of a housing removed of one embodiment of cooling apparatus constructed in accordance with the invention, FIG. 2 is a side elevation of the cooling apparatus of FIG. 1 with a side wall of the housing removed, FIG. 3 is a similar view to that of FIG. 1 of an another embodiment, FIG. 4 is a perspective view of an alternative form of fan casing and manner of mounting the casing in the housing, FIG. 5 is a diagrammatic front view of an alternative form of fan and housing side walls, FIGS. 6 and 7 are perspective views of alternative ways of constructing the housing illustrated in the apparatus of FIGS. 1, 2 and 3, FIGS. 8 and 10 are diagrammatic plan views of different forms of modular assemblies of cooling apparatus using the cooling apparatus of FIGS. 1 and 2 or FIG. 3 as the basic unit module, and FIGS. 9 and 11 are diagrammatic side and front views of the modular assembly of FIG. 10.

The apparatus of FIGS. 1 and 2 is a cooling tower comprising a liquid-tight housing generally indicated at 1 having a base wall 2, two shaped side walls 3 and 4 of similar shape, a generally I-shaped front wall 5 and a similarly shaped back wall 6. The housing 1 has a pan 7 in which liquid is collected. The housing walls 3 to 6 are extended outwardly as illustrated to form a seating 8 for a moisture removal member 9 at the top of the cooling apparatus, which member 9 comprises a plurality of moisture eliminator plates 10 (See FIG. 1). Preferably, the walls 2 to 6 are made from galvanised sheet metal and the eliminator plates 10 from galvanised steel or a suitable plastics material. Any other suitable materials may be used for making the housing walls and the eliminator plates providing that the materials are corrosion resistant, for example stainless and plastics coated steel and fibre glass. Directly beneath the eliminator plates 10, is disposed spray means constituted by a spray tree assembly comprising a spray header 11 extending beneath the side walls 3 and 4 and being connectible to a source of liquid to be cooled, header branches 12 and nozzles 13 depending from the branches 12. The nozzles 13 are operative to spray cooling liquid, usually water, in a plurality of droplets in a direction towards the pan 7. The branches 12 are held in position by snap-in rubber grommits (not shown) as also are the nozzles 13 to permit quick removal of the branches and nozzles for cleaning purposes. Preferably, the header 11 and its branches are made of steel or a suitable plastics material and the nozzles 13 made from a plastics material or brass although any other suitable material may be used. The area extending between the spray tree assembly and pan 7 constitutes a cooling area for the liquid to be cooled.

Beneath the spray tree assembly, is disposed heat exchange means in the form of a heat transfer 'fill' 17, which is supported on horizontal portions 16 of the side walls. The 'fill' 17 is of rectangular shape and fits in the space between the walls 3 to 6 so that preferably all its peripheral sides contact these walls. The 'fill' may be made of a suitable plastics material, asbestos, wood, or steel but it can be made of any other suitable material. Suitable forms of 'fill' are those manufactured by Munters Corporation, comprising a plurality of corrugated sheets of asbestos fibres treated with one or more thermosetting resins or inorganic compounds. In the cooling area beneath the 'fill' 17 is a chamber or region 21 defined by portions of the housing walls 3 to 6 and by the fan 7.

Fan means comprising a centrifugal fan 18 in casing means constituted by a scroll form casing 19 is disposed inside the housing chamber 21 of the 1 beneath the 'fill' 17, above the pan 7, and is operative to deliver a flow of air to the 'fill' through an outlet 20 in the fan casing. In the region 21 of the cooling area of the housing 1 air from the fan 18 contacts liquid from the spray tree assembly.

Conveniently, the fan casing is adjustably secured to the housing side walls 3 and 4 as by bolts 22 so that the position of the casing 19 may be adjusted to vary the direction, and provide for optimization, of the air flow. By securing the fan casing 19 directly to the housing walls 3 and 4 structural support is given to the housing, the casing and housing walls 3 and 4 providing mutual support. The fan casing 19 comprises a cut-off plate 23 having a lip 24 which can also serve to deflect liquid away from the fan casing outlet 20. The fan casing may be made from, for example galvanised steel which may be plastics coated, a suitable plastics material or fibre glass.

A gap 25 between the fan casing and the wall 6 prevents any build up of liquid between the fan casing and the wall 6. The casing outlet 20 faces towards the front wall 5 of the housing 1. The fan 18 has a bladed impeller 26 mounted on a shaft 27, the impeller drawing air through inlet openings 28 in the fan casing and inlet apertures 29 in the side walls 3 and 4. The openings 28 are aligned with the apertures 29.

Fan inlet diffusers 30 are secured to the side walls over the inlet apertures 29 and are removable to permit the fan impeller 26 to be removed for repair or replacement. The fan shaft 27 projects out of the inlet apertures 29 to be driven through two pulleys and a V-belt 31 by an electric motor 32 supported on a frame 33 mounted on the right-hand as illustrated one of two horizontal portions 34 of the wall 4 above the pan 7. As is known the inlets to the fan casing may be provided with adjustable dampers for controlling air flow into the fan casing 19. If desired or necessary one or more baffle plates 35 may be secured to the side walls 3 and 4 to assist in directing air from the fan towards the fill 17.

A large area strainer 36 comprising a plurality of screens and a specially formed plate constituting an anticavitation device 37 is disposed in the pan 7, over the outlet 38 in the wall 4 and leading from the pan 7. The strainer screens are inclined to permit self-cleaning but instead may be horizontal. The strainer screens may be made of a plastics material, steel or any other suitable material, and are of a size to be removable for cleaning through a liquid-tight access door 39 in the side wall 3. Also in the side wall 4 is an over-flow connection 40. A bleed line 41 can connect the header 11 to the over-flow connection 40, there being a valve 42 which is disposed in the bleed line for controlling the bleed rate. The bleed line bleeds off a predetermined quantity of liquid to compensate for the amount of liquid lost by evaporation and thereby keep the impurity level in the liquid at a relatively constant value.

A ball float valve 43 is arranged within the pan 7 and is connectible via a connection 44 in the right hand wall 4 to a source of fresh water to keep the level of liquid inside the pan from falling below a predetermined level. A drain connection 45 in the wall 5 in connected conveniently by a valve to a drain line (not shown). Alternatively, the connection 45 can be plugged. All the liquid connections may be in one side wall e.g. the right hand wall 4 and are, apart from the openings for the spray header 11 located beneath the fan casing 19. However, it will be appreciated that some or all of the liquid connections, access door etc. could be located differently in one or more of the housing walls.

The cooling tower described operations as follows: water to be cooled is pumped from a source where it has been used as a cooling agent, into the spray header 11, whence it flows through the branches 12 and is dispersed through the nozzles 13. The water then traverses the 'fill' 17 where it comes into counterflow contact with air blown upwardly through 'fill' by the centrifugal fan 18. The water falling over the 'fill' 17 is cooled by evaporation when in contact with the blown air and falls downwardly through the regions 21 of air/water contact over the fan casing 19 and into the pan 7 through the strainer 18 and the cooled water flows through the anti-cavitation device 17, the outlet connection 38 and back to its source for another cooling operation. The moisture saturated air leaves the cooling tower via the moisture eliminators 10.

Some of the water entering the spray header 11 passes through the bleed line 41, the valve 42 and into the overflow 40. Any water which is evaporated and bled off is made up through the ball float valve 43 so that when the water level in the pan drops, the valve 43 is opened to let fresh water into the pan. When the water in the pan is at the correct level, the valve 42 will be closed.

The cooling apparatus illustrated in FIG. 3 differs from that of FIGS. 1 and 2 in that a gas or liquid to be condensed or cooled respectively is passed through heat exchange means in the form of a pipe bundle 50 represented for clarity by one series of coils or loops, forming a primary closed fluid circuit or path. The pipe bundle 50 has a fluid inlet 51 and a fluid outlet 52 at its respective ends, which are adapted to be connected in the circuit of a liquid or gas to be cooled depending upon whether the apparatus is to be used as an evaporative cooler or evaporative condenser. For use as an evaporative condenser the outlet 52 only is provided with an equalizing connection 53. The pipe bundle is supported by fixing rods 54 extending between and secured to the front and back housing walls 5 and 6: if necessary, the rods 54 can be supported on a suitable frame.

Furthermore instead of being connected to a source of liquid to be cooled the spray head 11 is connected to a supply circuit for a cooling liquid, constituting a secondary fluid path. The supply circuit comprises a pipe 55 connected to the spray header 11 and connected to the pan 7 through outlet connection 38. A pump 56 connected to the pipe 55 draws cooling water from the pan 7 through the anticavitation device 37 over the outlet connection 38 and pumps it to the spray header 11. A bleed line 57 connects the pipe 55 to the overflow connection 40 to drain via a valve 58 for controlling the bleed rate. The pump 56 is driven through a coupling 59 by a motor 60 supported on the portion 34 of the side wall 4. The bleed line 57 serves a similar function to the bleed line 41 of FIG. 1.

The closed circuit evaporative cooler and evaporative condenser operates in the following manner. The fan is switched on to direct cooling air over the pipe bundle 50. Cooling water is pumped from the pan 7 through the spray header 11 which sprays the cooling liquid over the pipe bundle coils from whence it passes through the air/water contact region 21 over the fan casing 19 and into the pan 7. Heated gas or liquid, as the case may be, to be condensed or cooled is passed through the pipe bundle 50 where the gas is condensed or the liquid cooled in passage therethrough by the evaporative cooling engendered by the sprayed cooling water and counter current of cooling air which are in heat exchange relationship with the pipe bundle. The supply of cooling water in the pan which is continuously recycled by the pump 56 may be topped up if necessary by adding fresh water to the pan 7 as described with reference to FIGS. 1 and 2.

The fan casing 19 may replaced by a fan casing 61 as shown in FIG. 4. In FIG. 4 the casing 61 is disposed in an inverted position with its outlet 20 facing downwards instead of to one side but bolts 22 for securing the fan casing directly to the housing side walls 3 and 4 permit the fan casing to be turned about the shaft 27 to adjust the position of the fan casing and thus of the outlet 20 as with the casing 19. In the fan outlet 20 are mounted baffles 62 which are either fixed for directing air towards the 'fill' 17 or pipe bundle 50 as the case may be or are adjustable for controlling air flow volume.

As another alternative, the centrifugal fan 18 and casing 19 may be replaced by an axial fan 63 having an impeller 68 driven by bevel gears 64 and a shaft 69 from the motor 32, as shown in FIG. 5. Air is drawn in by the fan 62 through inlet apertures 65, which are larger than the apertures 29 and which have louvres 66, and delivered to the 'fill' 7 or pipe bundle 50 as the casing may be.

The housing walls 2 to 6 may be formed from a plurality of separate panels 2a to 6a as shown in FIG. 6. The two side panels 3a and 4a are held together by front and back panels 5a and 6a which are provided with the illustrated flanges for this purpose, the panels being fittable together with the aid of a suitable jig to form with appropriate sealing a liquid-tight housing 1a. Apart from the flange portions 67 of the panels 5a and 6a the panels can be pressed out of sheet metal in one operation, forming the portions 16a as folds, thereby reducing costs. Apertures in the panels for connections and those parts of the apparatus corresponding to those illustrated in FIGS. 1 to 3 are designated by the same reference numeral but with the addition of the latter a. For example, the spray header 11 is fitted in apertures 11a in the side panels 3a and 4a, the aperture 11a in the panel 3a normally being closed.

As an alternative to the separate side panels of FIG. 6 the housing 1 may be constructed from three boxlike sections, namely a pan section 70, a fan section 71 supported on the pan section by flanges 72 and a heat exchange section 73 supported on flanges 74 of the fan section, as shown in FIG. 7.

Thus each wall 3b to 6b has three separate parts, one in each section. The reference numerals for apertures in the walls 3b to 6b of the housing 1b corresponding to the connections and those parts which correspond to those in FIGS. 1 to 3 are given the same reference numeral with the addition of the letter b. If the fan 63 of FIG. 5 were used the side walls in FIGS. 6 and 7 would have the louvred inlet apertures 65.

By virtue of the illustrated shape of the housings described the cooling apparatus constitutes a module which can be used as a single module basis for a modular assembly of cooling apparatus such as is illustrated in FIGS. 8 to 11. In FIG. 8, three modules are assembled side by side to form a single width three modular assembly 80. The adjacent side walls 3, 4 are of modified construction, for example, they comprise only those portions of the side walls 3, 4 beneath, and including, the portions 16. The assembly of FIG. 8 looks the same in front/rear view (see FIG. 11), as that of a double-width six-module assembly to be described.

In FIGS. 9 to 11, six cooling towers are assembled side by side and end to end to form a double bank or width six module assembly. As well as having adjacent modified side walls, the adjacent front and back walls 5, 6 are also of modified construction, for example, they comprise only the leg portion of the I of the walls 5 and 6, intermediate the upper and lower bar portions. Each line 80 of three modules may be provided with a common moisture removal member comprising eliminator plates instead of its own moisture removal member 9.

In FIGS. 8 and 10, the adjacent fan shafts 27 or in the case of axial fan 63 the shafts 69 of the respective modules are aligned and connected together for example by flexible couplings or replaced by a common shaft. It will be appreciated from the position of the shafts 27 that the fan casings 19, not shown here for clarity are in alignment. Air is drawn in through both sides of the assembly and through front/rear spaces between adjacent modules covered by gride 82. Also, in the spray headers 11 of the respective modules of the or each line 80 are either connected together or replaced by a common header 11, the liquid entering through the apertures 11a or 11b for example at one of the side walls e.g. 4 at the end of the or each line.

It will be appreciated from FIGS. 8 and 11 that the possible range of modular assemblies using the single unit modules of FIGS. 1 to 3 or these Figures as modified by FIGS. 4 or 5 is virtually unlimited.

The cooling apparatus described is more compact, i.e. much smaller and lighter, than other forms of cooling apparatus known to the Applicant by virtue, inter alia, of the fan means being mounted within the cooling area of the housing in the region 21 which is normally taken up by air in these known cooling apparatus and of the reduction in parts utilised. For example, the 'fill' is supported from the horizontal portions of the side walls, the eliminator plate assembly lays into the tops of the side walls and the fan casing itself is fixed to the side walls and does not need any other supports. Such saving in space, weight, and materials also results in a reduction in outlay and costs. Furthermore, since the fan means is located in the air/liquid contact region 21, the cooling apparatus described are quieter to operate.

Various modifications may be made without departing from the scope of the invention as defined in the appended claims. For example, the centrifugal fan 18 and casing 19 may be replaced by two similar aligned fans with or without casings, drawing air through the respective apertures 29 in the side walls 3 and 4 by two axial fans arranged in casings secured to the side walls 3 and 4 respectively to draw air through the apertures 29. In the latter case suitable baffling is arranged to prevent interference between air flows from the two fans and direct the air towards the heat exchange means. The fan casings of the two centrifugal and axial fans are secured rigidly together to constitute casing means which imparts structural support to the housing.

The spray tree assembly may be replaced by an apertured pan or trough, the liquid flowing through the apertures to the heat exchange means. The fans may be driven by any other appropriate means either direct or indirect.

As shown by the dash dotted lines in FIG. 11 the front and back housing walls 5 and 6 of the modules may be modified to increase the quantity of air available to the respective fans. In FIG. 11, the upper wall portions 81 of the module housings are narrower to provide a space 83 between each pair of adjacent modules. The spaces 83 are covered by grids 84.

I claim:

1. In an evaporative liquid cooling apparatus having a housing, means in said housing, for delivering a liquid downwardly through said housing, heat exchange means disposed in said housing, beneath said liquid delivery means, collecting means in said housing, for said liquid, said collecting means being located beneath said heat exchange means, a chamber in said housing, beneath said heat exchange means and defined by said collecting means and wall portions of said housing, and fan means for delivering a flow of air to said heat exchange means, the improvement comprising
  a. fan means located inside said chamber, above said collection means, said fan means comprising,
    i. casing means extending between oppositely facing ones of said housing wall portions, said oppositely facing housing wall portions defining air inlet apertures, and side casing means defining air inlet openings, at its opposite sides, which align with said air inlet apertures, and an air outlet opening, and
    ii. at least one fan in said casing means, and
  b. means securing said opposite sides of said casing means directly to said oppositely facing housing wall portions.

2. Evaporative liquid cooling apparatus as claimed in claim 16, and including means adjustably securing said casing means to said oppositely facing housing wall portions to vary the direction of air flow therefrom.

3. Evaporative liquid cooling apparatus as claimed in claim 16, wherein the said at least one fan is a centrifugal fan and said casing means is a scroll form of casing.

4. Evaporative liquid cooling apparatus as claimed in claim 1, wherein the air outlet opening of said casing means faces in the general direction of another of said housing wall portions which extends between said oppositely facing housing wall portions.

5. Evaporative liquid cooling apparatus as claimed in claim 1, wherein the air outlet opening of said casing means has fixed or adjustable baffles for directing air towards the heat exchange means or controlling air flow volume respectively.

6. Evaporative liquid cooling apparatus as claimed in claim 1, including a baffle extending between and secured to said oppositely facing housing wall portions in the path of air flow from the fan means to direct air from the fan towards the heat exchange means.

7. Evaporative liquid cooling apparatus as claimed in claim 1, wherein the housing is constructed mainly from five separate panels, said panels comprising four side panels and a base panel, each of said side panels comprising first integral flange means supporting said heat exchange means, second integral flange means located above said liquid delivery means and supporting moisture eliminator means, said first and second flange means projecting inwardly of said housing, and third integral flange means projecting outwardly at the base of said housing and abutting said base panel.

8. Evaporative liquid cooling apparatus as claimed in claim 1, wherein the housing is constructed in the general shape of an I and such that the cooling apparatus constitutes a module which can be used as a single module basis for a modular assembly comprising a plurality of such modules.

9. Evaporative liquid cooling apparatus comprising a plurality of modules such as is claimed in claim 8 arranged in at least one line, the fan means of the modules having fan impellers which are connected to drive shaft means extending in the direction of said at least one line.

10. Evaporative liquid cooling apparatus as claimed in claim 1, wherein said air outlet opening of said casing means never faces in an upward direction.

11. Evaporative liquid cooling apparatus as claimed in claim 1, wherein said heat exchange means is constituted by a fill.

12. Evaporative liquid cooling apparatus as claimed in claim 1, wherein said heat exchange means is constituted by means defining a closed fluid path.

13. Evaporative liquid cooling apparatus as claimed in claim 1, and further comprising first flange means integral with and projecting inwardly of said housing and supporting said heat exchange means, and moisture eliminator means disposed above said liquid delivery means and supported on second flange means integral with, and projecting inwardly of, said housing.

14. Evaporative liquid cooling apparatus as claimed in claim 1, wherein another of said housing wall portions extending between said oppositely facing housing wall portions and a portion of said casing means define therebetween a gap for guarding against build up of liquid between the casing means and said another housing wall portion.

15. Evaporative liquid cooling apparatus as claimed in claim 1, wherein said housing is generally of I-shaped configuration and wherein one of the outwardly projecting portions of the base of the I provides a horizontal portion from which is supported a drive motor connected to said fan.

16. In an evaporative liquid cooling apparatus having a housing, means in said housing, for delivering a liquid downwardly through said housing, heat exchange means disposed in said housing, beneath said liquid delivery means, collecting means in said housing, for said liquid, said collecting means being located beneath said heat exchange means, a chamber in said housing, beneath said heat exchange means and defined by said collecting means and wall portions of said housing, and fan means for delivering a flow of air to said heat exchange means, the improvement comprising:
  a. fan means located inside said chamber, above said collecting means, said fan means consisting of an axial fan without a casing and comprising
    i. an impeller mounted on a generally vertically extending rotatable shaft,
  b. at least one of said housing wall portions defining at least one air inlet aperture for said axial fan and
  c. means extending through said at least one air inlet aperture and into said chamber, for connecting said generally vertical rotatable shaft to a motor for driving said impeller.

17. Evaporative liquid cooling apparatus as claimed in claim 16, wherein the housing is constructed mainly from five separate panels, said panels comprising four side panels and a base panel, each of said side panels comprising first integral flange means supporting said heat exchange means, second integral flange means located above said liquid delivery means and supporting moisture eliminator means, said first and second flange means projecting inwardly of said housing, and third integral flange means projecting outwardly at the base of said housing and abutting said base panel.

18. Evaporative liquid cooling apparatus as claimed in claim 16, wherein the housing is constructed in the general shape of an I and such that the cooling apparatus constitutes a module which can be used as a single module basis for a modular assembly comprising a plurality of such modules.

19. Evaporative liquid cooling apparatus comprising a plurality of modules such as is claimed in claim 18 arranged in at least one line, the fan means of the modules having fan impellers which are connected to drive shaft means extending in the direction of said at least one line.

20. Evaporative liquid cooling apparatus as claimed in claim 16, wherein said heat exchange means is constituted by a fill.

21. Evaporative liquid cooling apparatus as claimed in claim 16, wherein said heat exchange means is constituted by means defining a closed fluid path.

22. Evaporative liquid cooling apparatus as claimed in claim 16, and further comprising first flange means integral with and projecting inwardly of said housing and supporting said heat exchange means, and moisture eliminator means disposed above said liquid delivery means and supported on second flange means integral with, and projecting inwardly of, said housing.

23. Evaporative liquid cooling apparatus as claimed in claim 16, wherein said housing is generally of I-shaped configuration and wherein one of the outwardly projecting portions of the base of the I provides a horizontal portion from which is supported a drive motor connected to said fan.

24. Evaporative liquid cooling apparatus as claimed in claim 16, and including adjustable means positioned in said at least one opening to vary the volume of air delivered to said heat exchange means by said axial fan.

25. In an evaporative liquid cooling apparatus having a housing, means in said housing, for delivering a liquid downwardly through said housing, heat exchange means disposed in said housing, beneath said liquid delivery means, collecting means in said housing, for said liquid, said collecting means being located beneath said heat exchange means, a chamber in said housing, beneath said heat exchange means and defined by said collecting means and wall portions of said housing, and fan means for delivering a flow of air to said heat exchange means, the improvement comprising;
 a. fan means located inside said chamber, above said collecting means, said fan means consisting of at least one centrifugal fan without a casing, and
 b. oppositely facing ones of said housing wall portions defining air inlet apertures for said at least one fan.

* * * * *